US012607575B2

(12) United States Patent
Kraken et al.

(10) Patent No.: US 12,607,575 B2
(45) Date of Patent: Apr. 21, 2026

(54) METHOD FOR DETERMINING THE PLACEMENT ACCURACY OF A PLURALITY OF ELECTRODE SHEETS IN A STACK

(71) Applicant: PowerCo SE, Salzgitter (DE)

(72) Inventors: Mathias Kraken, Braunschweig (DE); Erik Rohkohl, Wolfenbüttel (DE); Sven Rathmann, Braunschweig (DE); Malte Schönemann, Braunschweig (DE); Alexander Tornow, Ummern (DE)

(73) Assignee: PowerCo SE, Salzgitter (DE)

( * ) Notice: Subject to any disclaimer, the term of this patent is extended or adjusted under 35 U.S.C. 154(b) by 390 days.

(21) Appl. No.: 17/855,540

(22) Filed: Jun. 30, 2022

(65) Prior Publication Data

US 2023/0003670 A1 Jan. 5, 2023

(30) Foreign Application Priority Data

Jul. 2, 2021 (DE) ..................... 10 2021 117 152.0

(51) Int. Cl.
| | |
|---|---|
| *G01N 23/04* | (2018.01) |
| *G01N 23/083* | (2018.01) |
| *H01M 10/0525* | (2010.01) |
| *H01M 10/0585* | (2010.01) |

(52) U.S. Cl.
CPC ........... *G01N 23/04* (2013.01); *G01N 23/083* (2013.01); *G01N 2223/04* (2013.01); *G01N 2223/40* (2013.01); *H01M 10/0525* (2013.01); *H01M 10/0585* (2013.01)

(58) Field of Classification Search
CPC ......... H01M 10/0463; H01M 10/0585; H01M 10/0525; G01N 2223/40; G01N 2223/04; G01N 23/044; G01N 23/083
See application file for complete search history.

(56) References Cited

U.S. PATENT DOCUMENTS

| | | | |
|---|---|---|---|
| 2011/0096900 A1* | 4/2011 | Park ..................... | G01N 23/083 378/51 |
| 2016/0254553 A1* | 9/2016 | Winter .............. | H01M 10/0486 73/40.7 |
| 2017/0077561 A1* | 3/2017 | Fukuda ............... | H01M 10/482 |
| 2019/0341658 A1* | 11/2019 | Han .................... | H01M 10/052 |

(Continued)

FOREIGN PATENT DOCUMENTS

| | | | |
|---|---|---|---|
| DE | 10 2020 112 814 A1 | 5/2020 | |
| EP | 3826090 A1 * | 5/2021 | ........ H01M 10/0585 |

(Continued)

*Primary Examiner* — David J Makiya
*Assistant Examiner* — Soorena Kefayati
(74) *Attorney, Agent, or Firm* — PEARL COHEN ZEDEK LATZER BARATZ LLP

(57) ABSTRACT

A method for determining the placement accuracy of a plurality of electrode sheets, wherein the electrode sheets extend on mutually parallel planes and are stacked on top of one another and form a stack; wherein the placement accuracy describes positions of the edges of all of the electrode sheets relative to one another in the stack; wherein the method is carried out using a measuring device having a two-dimensionally resolving X-ray system with at least one beam source for X-ray radiation and a detector.

11 Claims, 4 Drawing Sheets

(56)     References Cited

U.S. PATENT DOCUMENTS

| 2020/0350637 | A1 * | 11/2020 | You | G01N 23/046 |
| 2020/0363344 | A1 * | 11/2020 | Heo | G01N 23/18 |
| 2020/0365952 | A1 * | 11/2020 | Nagano | G01R 31/3648 |
| 2021/0249702 | A1 * | 8/2021 | Murphy | G01R 31/3865 |

FOREIGN PATENT DOCUMENTS

| JP | 2011039014 A | 2/2011 |
| KR | 10 2020 0088 222 A | 7/2020 |
| KR | 102236815 B1 | 4/2021 |
| WO | WO 2016/114257 A1 | 7/2016 |

* cited by examiner

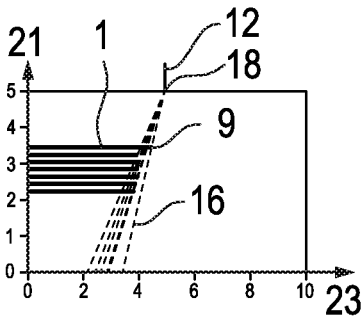
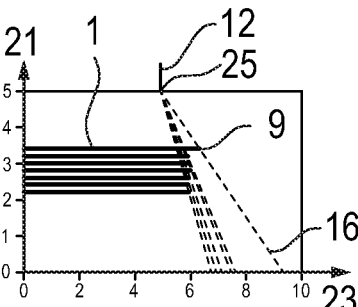
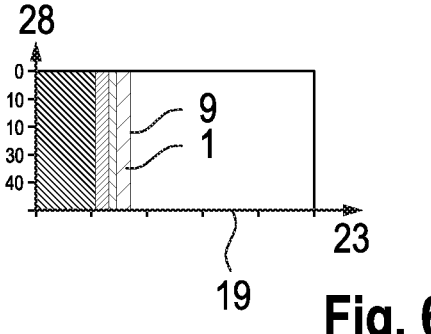
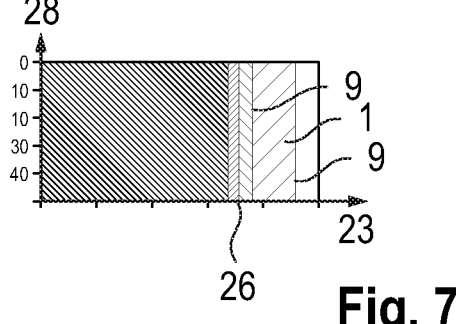
Fig. 6
Fig. 7
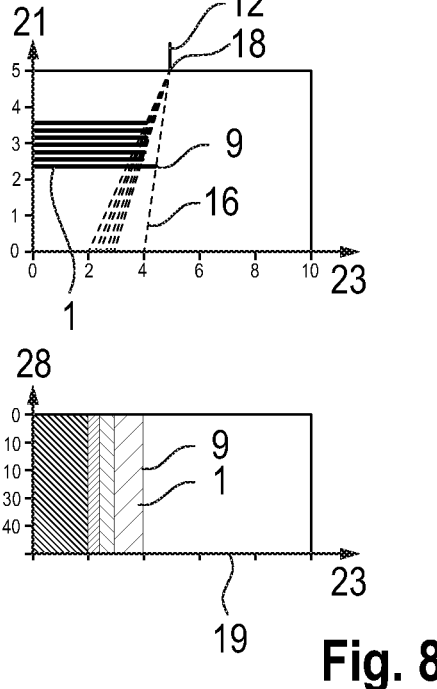
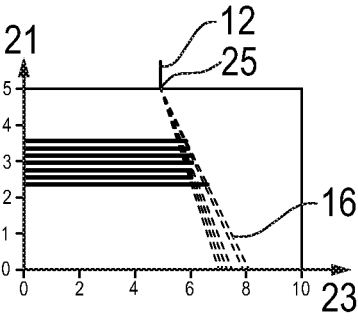
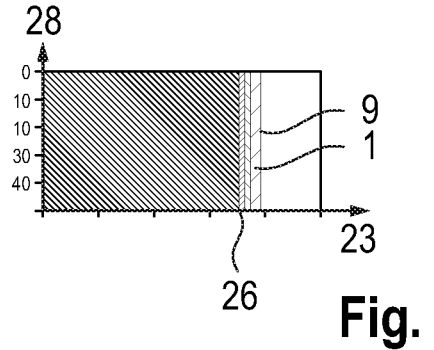
Fig. 8
Fig. 9

METHOD FOR DETERMINING THE PLACEMENT ACCURACY OF A PLURALITY OF ELECTRODE SHEETS IN A STACK

CROSS REFERENCE TO RELATED APPLICATION

This application claims priority from German Patent Application No. 10 2021 117 152.0, filed Jul. 2, 2021, which is incorporated herein by reference in its entirety.

BACKGROUND OF THE INVENTION

The invention relates to a method for determining the placement accuracy of a plurality of electrode sheets in a stack. The electrode sheets extend on mutually parallel planes and are stacked on top of one another and form a stack. Placement accuracy describes the positions of the edges of all of the electrode sheets relative to one another in the stack.

Batteries, and particularly lithium-ion batteries, are increasingly being used to drive motor vehicles. Batteries are typically assembled from cells, with each cell having a stack of anode, cathode, and possibly separator sheets or separator material. These anode sheets, cathode sheets, and possibly separator sheets are referred to below as electrode sheets.

The electrode sheets are usually manufactured by stamping or cutting, for example by laser cutting.

The placement accuracy of the individual electrode sheets in a stack has a significant impact on the safety-related quality criteria of lithium-ion battery cells and their performance. The placement accuracy—i.e., the deviation of the positions of the individual electrode sheets from one another—must therefore be kept within narrow limits. One established method for determining placement accuracy is computed tomography (CT). A three-dimensional image of a stack is generated by means of a lengthy measurement. This method is very expensive and therefore has only limited suitability for use in a production line.

In contrast to computed tomography, there are also measuring devices that enable two-dimensional imaging of the stack or test object using X-rays. These are substantially cheaper and also enable measurements to be carried out more quickly than with computed tomography. However, a direct measurement of the position of the electrode sheets relative to one another cannot be made in this manner.

A conveying device for a battery cell is known from KR 10 2020 0088 222 A. There, the conveying device comprises X-ray sources by means of which the edges of the individual layers of the battery cell are scanned. The X-ray sources are aligned in such a way that the X-rays are aligned parallel to the edge of the layers that are to be detected.

It is known from WO 2016/114257 A1 to use X-rays to detect the edges of the coated regions of an electrode film. The X-ray sources are aligned in such a way that the X-rays are aligned parallel to the edge of the layers that are to be detected.

A device for inspecting battery cells using radiography is known from DE 10 2020 112 814 A1. There, the battery cell is able to be moved relative to the X-ray source. The X-ray sources are aligned in such a way that the X-rays are aligned parallel to the edge of the layers that are to be detected.

It is the object of the present invention to at least partially solve the problems described. In particular, a method for determining the placement accuracy of a plurality of electrode sheets in a stack is to be proposed. In particular, the positions of each individual electrode sheet should be able to be determined, thus enabling a deviation to be correlated with a specific electrode sheet of the stack.

SUMMARY OF THE INVENTION

A method with the features as claimed contributes to the achievement of these objects. Advantageous developments are the subject of the dependent claims. The features listed individually in the claims can be combined in a technologically meaningful manner and supplemented by explanatory facts from the description and/or details of the figures, with additional design variants of the invention being indicated.

A method for determining the placement accuracy of a plurality of electrode sheets is proposed. The electrode sheets extend on mutually parallel planes, are stacked on top of one another, and form a stack. Placement accuracy describes the positions of the edges of all of the electrode sheets relative to one another in the stack or the precision of the overlapping of the edges of the electrode sheets. The method is carried out using a measuring device that has a two-dimensionally resolving X-ray system with at least one beam source for X-rays and a detector. The method comprises at least the following steps:

- a) providing the stack and arranging the stack in the measuring device between the at least one beam source and the detector;
- b) irradiating the stack with the at least one beam source from a first spatial coordinate, with the beam direction extending at least transversely to the planes and toward the detector, and with a beam from the beam source detecting the edges of the electrode sheets that are arranged one above the other and projecting a two-dimensional first contour of the edges of the stack onto the detector;
- c) irradiating the stack with the at least one beam source from at least one second spatial coordinate that differs from the first spatial coordinate, the beam detecting the stacked edges of the electrode sheets and projecting a two-dimensional second contour of the edges of the stack onto the detector;
- d) detecting the first contour using the detector;
- e) detecting the at least one second contour using the detector;
- f) evaluating the different contours and determining the positions of the edges of the electrode sheets.

The above (non-exhaustive) breakdown of the method steps into a) through f) is primarily intended to serve purposes of distinction and not to impose any order and/or dependency. The frequency of the method steps, e.g., during the implementation of the method, may vary. It is also possible for method steps to overlap temporally at least in part. Method step a) very especially preferably takes place before steps b) to f). In particular, steps b) and c) take place with a time-shift relative to one another. In particular, step d) takes place at the same time as step b), and step e) at the same time as step c). In particular, steps c) and e) can be carried out multiple times, with the respective spatial coordinates differing from the previous spatial coordinates. In particular, steps a) to f) are carried out in the following order: step a), step b), step d), step c), step e), step f).

The method is used in particular as part of a method for manufacturing battery cells. Electrode sheets, i.e., anode sheets, cathode sheets, and possibly separator sheets, that are cut to a suitable shape are arranged in a predetermined sequence to form a stack and aligned with one another. In the stack created in this manner, the individual electrode sheets should be arranged in the most aligned (edge) position relative to one another.

The electrode sheets extend particularly on mutually parallel planes and, when stacked on top of one another, form a stack. The stack comprises at least two electrode sheets, i.e., at least one anode sheet and one cathode sheet. A respective separator material is arranged between an anode sheet and a cathode sheet. This separator material can be embodied as a coating on either the anode sheet or cathode sheet, or as a separate separator sheet.

In particular, the electrode sheets each have a substantially rectangular shape. Where appropriate, conductor lugs extend beyond this rectangular shape. These are generally uncoated, i.e., not coated with the active material, and are used for the electrical contacting of the respective electrode sheet, i.e., the anode or cathode sheet.

Placement accuracy describes, in particular, the positions of the edges of all of the electrode sheets relative to one another in the stack. In particular, the electrode sheets should be arranged in a predetermined position relative to one another. Since the size of anode sheets and cathode sheets as well as of any separator sheets that may be present can differ from one another, the placement accuracy is determined particularly at the edges of the electrode sheets, which are aligned with one another along a first direction extending transversely to the planes.

In particular, the placement accuracy of the electrode sheets is only determined at one edge of an electrode sheet.

The method is carried out in particular using a measuring device that has a two-dimensionally resolving X-ray system with at least one beam source for X-rays and a detector. A plurality of stationary or even mobile beam sources can be provided. It is also possible for a number of stationary or even mobile detectors to be provided.

A beam source is used to emit X-rays along a beam direction. A detector is used to record the X-ray radiation in order to display an X-ray image.

In particular, the detector enables a two-dimensional image of the X-ray radiation to be displayed. The proposed method is intended to enable the electrode sheets to be placed accurately from these two-dimensional images taken by the detector.

According to step a), the stack is provided and arranged in the measuring device between the at least one beam source and the detector. It is possible for the stack is formed separately and then placed in its entirety in the measuring device. However, it is also possible for the stack itself to be (partially) formed in the measuring device and thus arranged at the same time.

According to step b), the stack is irradiated with the at least one beam source from a first spatial coordinate, with the beam direction extending at least transversely to the planes and toward the detector. A beam from the beam source detects the stacked edges of the electrode sheets and projects a two-dimensional first contour of the edges of the stack onto the detector. In particular, the beam source is arranged precisely above the edges, i.e., without a lateral offset relative thereto.

In arranging the stack, it is assumed that the edges of the electrodes are in a predetermined desired position. The actual position of the edges deviating therefrom is determined as part of the method.

According to step d), the first contour is detected using the detector.

According to step c), the stack is irradiated with the at least one beam source from at least one second spatial coordinate that differs from the first spatial coordinate, the beam detecting the stacked edges of the electrode sheets and projecting a two-dimensional second contour of the edges of the stack onto the detector.

According to step e), the at least one second contour is detected using the detector.

According to step f), the various contours are evaluated and the positions of the edges of the electrode sheets are determined. The evaluation can be carried out particularly using a data processing system.

In particular, the measuring device comprises a system for data processing having means which are suitably equipped, configured, or programmed to carry out the method, more particularly which carry out the method. The means comprise, for example, a processor and a memory in which instructions to be executed by the processor are stored, as well as data lines or transmission devices which enable instructions, measured values, data, or the like to be transmitted between the listed elements.

A contour detected by the detector comprises a two-dimensional image in which the edges of the electrode sheets can be identified based on the transitions between color intensities. It is not readily possible to correlate the edges present in the contour to individual electrode sheets. In the following, one possibility will be proposed for enabling this correlation to be implemented.

In the framework of the method, multiple contours of one stack are generated by the beam source and detected by the detector. Due to the different arrangement of the beam source relative to the stack or the edges, different contours are generated. These contours are evaluated particularly using linear equations, which means that, by virtue of the known arrangement of beam source and detector and the linear, i.e., rectilinear course of the beam generated by the beam source, the position of the edges in the respective contour can be used to infer the position of the respective edge in the stack. In particular, as many different contours are generated as are necessary in order to determine the position of the edge for each of the electrode sheets present in the stack.

In particular, two different configurations of the method are possible, which can be optionally combined with one another.

In a first embodiment, the beam source is moved between steps b) and d) parallel to the planes toward the second spatial coordinate. In a second embodiment, the beam source is moved between steps b) and d) transversely to the planes toward the second spatial coordinate. The different contours created in this manner enable the edge of each electrode sheet to be unambiguously determined.

In particular, the first spatial coordinate and the at least one second spatial coordinate differ by a different separation from the stack. The separation extends along a first direction extending transversely to the planes. Alternatively or in addition, the first spatial coordinate and the at least one second spatial coordinate differ by a different distance from the edges, the distance extending along a second direction that extends parallel to the planes and transversely to the edges.

In particular, steps c) and e) are each carried out multiple times, with the second spatial coordinates of each step c) differing from the respective previous second spatial coordinates of the previous steps c) in the manner described, i.e., according to the first embodiment and/or the second embodiment.

In particular, in step f) the individual edges in the respective contour are correlated with the respective spatial coordinates using linear equations.

This correlation is described below as an example. The stack, the beam source, and the detector are viewed on a common plane. A spatial coordinate z is therefore identical for all components. The first direction, i.e., transverse to the planes, extends along a y axis. The second direction, i.e., parallel to the planes, extends along an x axis.

For example, the first spatial coordinates are $(x_{q1}|y_{q1})$, and the second spatial coordinates are $(x_{q2}|y_{q2})$. The spatial coordinates of the edge of a particular electrode sheet that is to be determined are denoted as $(x_e|y_e)$. The positions of the edges of this electrode sheet in the first contour detected by the detector are $(x_{d1}|y_{d1})$ for the first spatial coordinates of the beam source and, in the second contour, $(x_{d2}|y_{d2})$ for the second spatial coordinates of the beam source.

The following applies to the linear equation for the first spatial coordinates of the beam source:

$$m_1 = \frac{\Delta y_1}{\Delta x_1} = \frac{y_{d1} - y_{q1}}{x_{d1} - x_{q1}} \quad (1)$$

$$y = m_1 \cdot (x - x_{q1}) + y_{q1} \quad (2)$$

$$y = m_1 x + b_1 \quad (3)$$

For the linear equation of the second spatial coordinates of the beam source, the following applies:

$$m_2 = \frac{\Delta y_2}{\Delta x_2} = \frac{y_{d2} - y_{q2}}{x_{d2} - x_{q2}} \quad (1)$$

$$y = m_2 \cdot (x - x_{q2}) + y_{q2} \quad (2)$$

$$y = m_2 x + b_2 \quad (3)$$

These equations are equated, so that:

$$m_1 \cdot x + b_1 = m_2 \cdot x + b_2 \quad (4)$$

$$\rightarrow (m_1 - m_2) \cdot x = b_2 - b_1 \quad (5)$$

$$\rightarrow x_e = \frac{b_2 - b_1}{(m_1 - m_2)} \quad (6)$$

$$\rightarrow y_e = m_1 \cdot \frac{b_2 - b_1}{(m_1 - m_2)} + b_1 \quad (7)$$

In particular, the placement accuracy is evaluated in a step g). A limit value for a maximum deviation of the contour from a desired position of an edge is specified for the stack. For the maximum deviation, it is assumed that the electrode sheet that is closest to the detector produces the maximum deviation.

The maximum deviation is the maximum permissible difference between the desired position of an edge in the stack and an actual position of the edge. If the maximum deviation is exceeded, a measure is particularly initiated, e.g., the stack is marked designated as not in order, or the stack manufacturing process is adjusted.

The maximum deviation is determined particularly on the first contour, preferably using the linear equation, i.e., by taking into account the first spatial coordinates in relation to the desired position of the edges.

For the maximum deviation, it is assumed that the electrode sheet that is closest to the detector produces the maximum deviation. This electrode sheet is thus arranged farthest away from the beam source. Taking the beam equation into account, the discernible deviation in the contour of the position of an edge from the desired position is most pronounced for the electrode sheet that is arranged closest to the radiation source, meaning that the amount of the deviation is then greatest. The discernible deviation of the position of an edge from the desired position in the contour is least pronounced for the electrode sheet that is arranged farthest away from the radiation source, meaning that the amount of the deviation is then the least.

The assumption that the maximum deviation is generated by the electrode sheet that is arranged farthest away from the radiation source ensures, in particular, that no other electrode sheet can have a deviation from a desired position that exceeds the maximum deviation.

In particular, only steps a), b), d), f), and g) are initially carried out in order to determine the placement accuracy, and steps c) and e) are carried out only if it is determined in step g) that the limit value has been exceeded.

Each stack is thus checked in the context of the present method with regard to placement accuracy, but a determination of the positions of the edges of all of the electrode sheets in the stack is only made if the limit value is exceeded, for example. Otherwise, each stack is only checked for an overshoot of the limit value.

In particular, if it is determined that the limit value has been exceeded, steps c) and e) are carried out exactly twice with different (second) spatial coordinates, whereupon steps f) and g) are carried out again.

In particular, the first spatial coordinates, for example, are selected such that the radiation source is arranged precisely above, i.e., so as to be aligned in the first direction with the desired position of the edges of the stack. In particular, the two second spatial coordinates are then selected such that the radiation source is arranged so as to be offset relative to the first spatial coordinates in the second direction, particularly offset once toward the stack, so that the radiation source is aligned with the stack and offset once away from the stack, so that the radiation source is arranged laterally adjacent to the stack.

In particular, if it is repeatedly determined in step g) that the limit value has been exceeded, steps c) and e) are carried out with a number of repetitions that are required for the unambiguous determination of the positions of all edges.

By virtue of this step-by-step method, not every stack has to be fully measured (i.e., not all of the positions of the edges of all of the electrode sheets have to be determined) during the production of the stacks or the manufacture of the battery cells. The maximum deviation in the stack can be detected or estimated on the basis of fewer contours, i.e., fewer images taken by the detector. If the limit value is exceeded, further measurements can be used to determine the respective positions of the electrode sheets. If necessary, the positions are determined only for the electrode sheets that exceed the limit value or only for a specific selection of the electrode sheets, e.g., the one with the greatest deviation, etc.

In particular, an artificial intelligence is used at least for step f). The determination of the positions of the edges in the contours can be supported particularly with the aid of artificial intelligence. Furthermore, with the aid of artificial intelligence, the number of linear equations required for determining the positions of the edges of all of the electrode sheets can be reduced if necessary.

In particular, the contours are evaluated using a convolutional neural network (CNN). The convolutional neural network learns from a synthetic, i.e., artificially generated, data set for a stack with known positions of the edges of the electrode sheets in order to then determine the position of the edge of each electrode sheet from the contours of this stack detected in step d).

In order to utilize the CNN and ensure that the system of equations proposed herein is definitive, it is particularly necessary to take at least as many images according to steps b) and c) or to generate and evaluate as many contours as the number of electrode sheets that are to be measured.

In particular, a synthetic data set can be generated in order to train the CNN, which maps a random stack arrangement (electrode sheet number in the stack, alignment on the plane with known edge positions, etc.) to the different contours, first contour, and at least one second contour. The CNN then models the inverse mapping—i.e., the contours—onto the stack arrangement.

Instead of using a convolutional neural network, the evaluation can also be carried out using another machine or automated learning method. In the following, the focus will be on the convolutional neural network and the processes and terms used in relation thereto.

The use of such a CNN for the evaluation of images or contours, i.e., images taken by the detector, is inherently known. What is being proposed here is that a CNN be employed for the quality assessment of (cut) edges of the electrode sheets, i.e., in the context of the manufacture of battery components.

As part of the evaluation using CNN, a training data set—i.e., the synthetic data set—can be generated in order to implement an automated and inline-capable evaluation of the edges. The course of the edges can be marked manually on each contour or on each first image of the detector of this training data set. This manual marking, i.e., the marked course of the edge, is then exported manually from the tool. The course of the edges in the contour, which is encoded as a pixel matrix, maps the stack geometry or arrangement of the edges for the training data set—the so-called "ground truth."

Images in this set contain only pixels with the value zero ("0") or one ("1"), for no edge (e.g. value zero) or edge (e.g. value one) at the corresponding location in the contour or the first image.

In the following, a CNN is used to learn to map a mathematical first image of the edge shown in the first image to its corresponding geometry. The CNN trained in this manner can then recognize the geometry for second images taken by the detector or contours that were not previously learned. Due to the low variance of the first and second images of substantially similar bodies—here of edges of stacked electrode sheets with a fixed target edge geometry—and the statistical significance of large amounts of data, this detection is more accurate than comparable methods, such as trend edge detection.

As is known, the CNN consists of a series of so-called convolutional layers that discretely convolve a fixed number of filters with image sections. This layer calculates a so-called feature map for each of its filters. This feature map describes whether a pattern, defined by the filter parameters, was recognized at the corresponding point in the respective second image, more particularly in the contour. The size of these feature maps is reduced using so-called max pooling layers or average pooling layers in order to reduce computational complexity. The max-pooling or average-pooling layer shifts an n×n window over the feature map and, in particular, only transfers the maximum value from a section to the next layer.

The order and number of convolutional and max pooling or average pooling layers as well as the size of the respective windows and filters are so-called hyperparameters. The optimization of these hyperparameters is carried out particularly by a validation data set that has no influence on the optimization of model parameters.

In the last step, the values of all of the feature maps are concatenated into a vector—so-called flattening—and thus serve as input into a feed-forward neural network. This network, in turn, is characterized by a variable number of hidden layers and a variable number of neurons in each hidden layer. These numbers form further hyperparameters.

As an alternative to flattening, the condensed feature maps can first be transformed back to their original size using transposed convolution and their number can then be reduced back to one using convolutional layers.

In its output layer, the network attempts to approximate the manually generated edge geometry of the ground truth of the stack by assigning a zero or a one ("1") to each pixel.

At the beginning of the training, the filter parameters and the parameters of the feed-forward neural network (which together form the CNN) can be randomly initialized, which initially leads to an inaccurate geometry prediction. In the course of the training, all model parameters are adjusted using a so-called gradient descent method in such a way that the number of incorrectly classified pixels is minimal across all training examples.

After training, the CNN can be used, for example, as part of step f) and/or step g) for unknown stacks or newly created contours in order to identify the course or the position of at least one edge in the contour or in the second image of the detector.

In particular, at least one process parameter from the evaluation of the placement accuracy according to step g) used to produce the respective stack is determined and altered in a further step h), thereby improving the placement accuracy for further stacks.

In particular, if an overshoot of a limit value has been identified and/or validated in the context of subsequent measurements, the incorrectly positioned electrode sheet and the deviation thereof from the desired position can be determined. Accordingly, knowledge about the electrode sheet can be used to trace back the manufacturing process, and adjustable process parameters can be changed as appropriate.

In particular, a system for data processing is proposed having means which are suitably equipped, configured, or programmed to carry out the method, more particularly which carry out the method.

The means comprise, for example, a processor and a memory in which instructions to be executed by the processor are stored, as well as data lines or transmission devices which enable instructions, measured values, data, or the like to be transmitted between the listed elements.

A computer program is also proposed that comprises instructions which, when the program is executed by a computer, cause the computer to carry out the method described or, rather, the steps of the method described.

A computer-readable storage medium is also proposed that comprises instructions which, when executed by a computer, cause the computer to carry out the method described or, rather, the steps of the method described.

Remarks concerning the method can be applied particularly to the data processing system and/or to the computer-implemented method (i.e., the computer program and the computer-readable storage medium), and vice versa.

Particularly in the claims and in the description that describes them, the indefinite articles ("a" and "an") are to be understood as such and not as quantifiers. Accordingly, terms and components that are introduced therewith are thus to be understood as being present at least singly but particularly also possibly in a plurality.

By way of precaution, it should be noted that the number words used here ("first," "second," . . . ) serve primarily (only) to distinguish a plurality of similar objects, quantities, or processes; that is, they do not prescribe any dependency and/or order of these objects, quantities, or processes relative to one another. Should a dependency and/or order be required, this is explicitly stated herein or it obviously follows for a person skilled in the art when studying the embodiment specifically described. If a component can occur multiple times ("at least one"), the description of one of these components can apply equally to all or a portion of the plurality of these components, but this is not necessarily the case.

BRIEF DESCRIPTION OF THE DRAWINGS

The invention and the technical environment will be explained in greater detail with reference to the enclosed figures. It should be noted that the invention is not intended to be limited by the specified embodiments. In particular, unless explicitly stated otherwise, it is also possible to extract partial aspects of the features explained in the figures and to combine them with other components and insights from the present description. In particular, it should be pointed out that the figures and, in particular, the illustrated proportions are only schematic. In the drawings:

FIG. 6 shows steps c) and e) of the method for the first stack;

FIG. 7 shows repeated execution of steps c) and e) of the method for the first stack;

FIG. 8 shows steps c) and e) of the method for the second stack; and

FIG. 9 shows repeated execution of steps c) and e) of the method for the second stack.

DETAILED DESCRIPTION OF THE INVENTION

Figure 1:
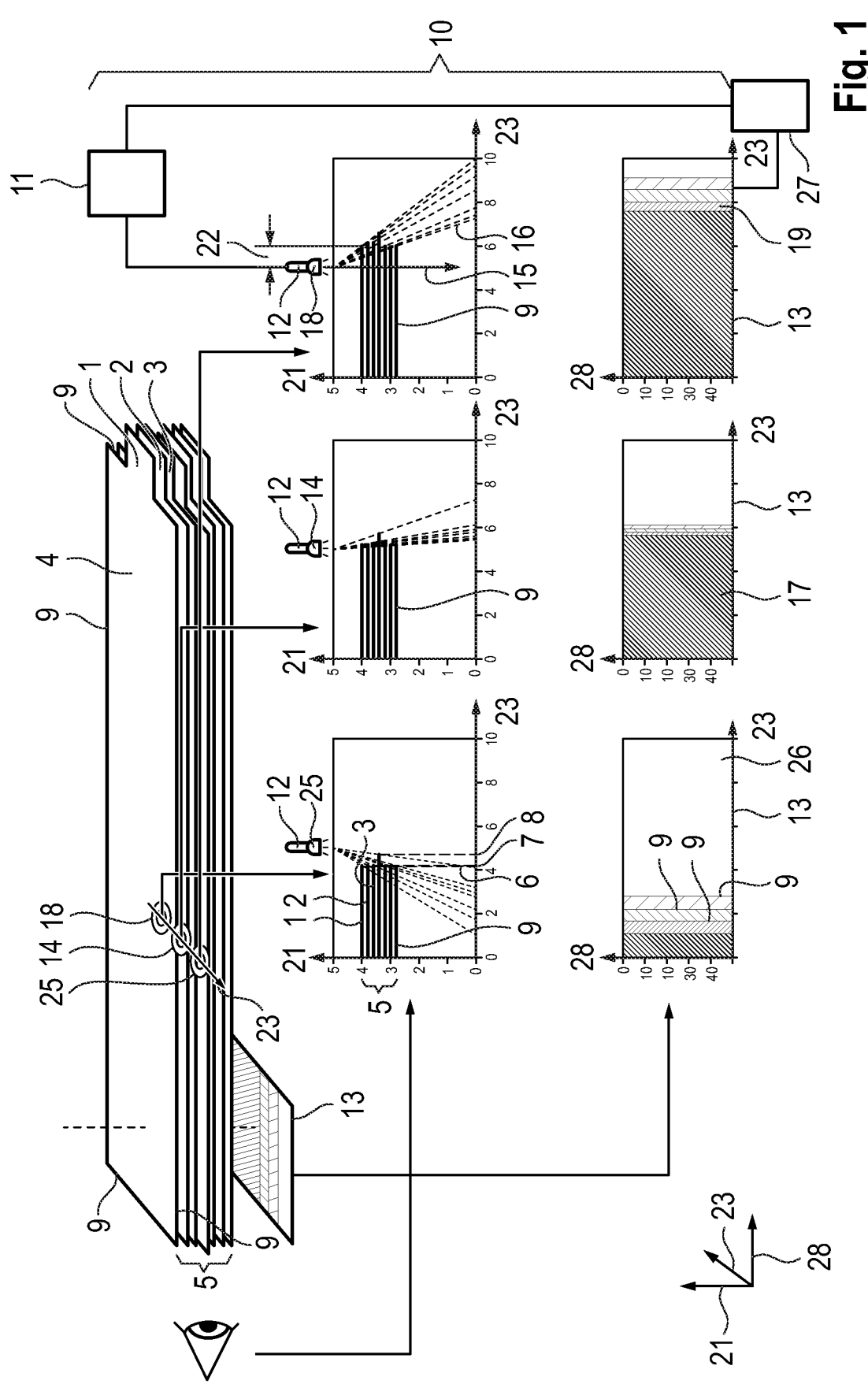
FIG. 1 shows a first embodiment of the method.

FIG. 1 shows a first variant of the method. The method is used as part of a method for manufacturing battery cells. Appropriately cut electrode sheets 1, 2, 3—i.e., anode sheets, cathode sheets, and possibly separator sheets—are arranged in a predetermined order to form a stack 5 and aligned with one another. In the stack 5 created in this manner, the individual electrode sheets 1, 2, 3 should be arranged in the most aligned position relative to one another.

The electrode sheets 1, 2, 3 extend on mutually parallel planes 4 and, when stacked on top of one another, form a stack 5. The stack 5 comprises a plurality of electrode sheets 1, 2, 3.

The electrode sheets 1, 2, 3 each have a substantially rectangular shape. Conductor lugs extend beyond this rectangular shape at an edge 9 of the electrode foils 1, 2, 3.

The placement accuracy describes the positions 6, 7, 8 of the edges 9 of all of the electrode sheets 1, 2, 3 relative to one another in the stack 5. The electrode sheets 1, 2, 3 should be arranged in a predetermined position relative to one another. Since the size of anode sheets and cathode sheets as well as of any separator sheets that may be present can differ from one another, the placement accuracy is determined at the edges 9 of the electrode sheets 1, 2, 3, which are aligned with one another along a first direction 21 extending transversely to the planes. The placement accuracy of the electrode sheets 1, 2, 3 is only determined at one edge 9 of an electrode sheet 1, 2, 3.

The method is carried out using a measuring device 10 that has a two-dimensionally resolving X-ray system 11 with a beam source 12 for X-ray radiation and a detector 13. The beam source 12 is used to emit X-rays along a beam direction 15. A detector 13 is used to record the X-ray radiation in order to display an X-ray image.

The detector 13 makes it possible to display a two-dimensional image (hereinafter referred to as contour 17, 19) of the X-ray radiation. The proposed method enables the electrode sheets 1, 2, 3 to be placed accurately from these two-dimensional images taken by the detector 13.

According to step a), the stack 5 is provided, and the stack 5 is arranged in the measuring device 10 between the one beam source 12 and the detector 13. According to step b), the stack 5 is irradiated with the beam source 12 from a first spatial coordinate 14, the beam direction 15 extending transversely to the planes 4 and toward the detector 13 (substantially along a first direction 21). A beam 16 from the beam source 12 detects the stacked edges 9 of the electrode sheets 1, 2, 3 and projects a two-dimensional first contour 17 of the edges 9 of the stack 5 onto the detector 13. The beam source 12 is arranged precisely above the edges 9, i.e., without a lateral offset relative to the edges 9.

In arranging the stack 5, it is assumed that the edges 9 of the electrodes 1, 2, 3 are in a predetermined desired position. The actual position 6, 7, 8 of the edges 9 deviating therefrom is determined as part of the method.

According to step d), the first contour 17 is detected using the detector 13.

According to step c), the stack 5 is irradiated with the beam source 12 from at least one second spatial coordinate 18 that differs from the first spatial coordinate 14, the beam 16 detecting the stacked edges 9 of the electrode sheets 1, 2, 3 and projecting a two-dimensional second contour 19 of the edges 0 of the stack 5 onto the detector 13.

According to step e), the second contour 19 is detected using the detector 13.

It is shown that steps c) and e) are carried out repeatedly, with the second spatial coordinates 18 of each step c) differing from the respective previous second spatial coordinates 18 of the previous steps c). The further spatial coordinates of this repetition of steps c) and e) are referred to as third spatial coordinates 25, and the contour detected in this manner as the third contour 26.

According to step f), the various contours 17, 19, 26 are evaluated and the positions 6, 7, 8 of the edges 9 of the electrode sheets 1, 2, 3 are determined. The evaluation is carried out by the system 27 for data processing.

The measuring device 10 comprises a system 27 for data processing, having means which are suitably equipped, configured, or programmed to carry out the method, more particularly which carry out the method. The means comprise, for example, a processor and a memory in which instructions to be executed by the processor are stored, as well as data lines or transmission devices which enable instructions, measured values, data, or the like to be transmitted between the listed elements.

A contour 17, 19, 26 detected by the detector 13 comprises a two-dimensional image in which the edges 9 of the electrode sheets 1, 2, 3 can be identified based on the transitions between color intensities. It is not readily possible to correlate the edges 9 present in the contour 17, 19, 26 to individual electrode sheets 1, 2, 3. The method described represents one way of achieving this correlation.

In the framework of the method, multiple contours 17, 19, 26 of one stack 5 are generated by the beam source 12 and detected by the detector 13. Due to the different arrangement of the beam source 12 relative to the stack 5 or the edges 9, different contours 17, 19, 26 are generated. These contours 17, 19, 26 are evaluated using linear equations, which means that, by virtue of the known arrangement of beam source 12 and detector 13 and the linear, i.e., rectilinear course of the beam 12 generated by the beam source 12, the position of the edges 9 in the respective contour 17, 19, 26 can be used to infer the position 6, 7, 8 of the respective edge 9 in the stack 5.

The first spatial coordinate 14 and the at least one second spatial coordinate 18, 25 (i.e., the second and third spatial coordinates) differ from one another by a different distance 22 to the edges 9, with the distance 22 extending along a second direction 23 that extends parallel to the planes 4 and transversely to the edges 9. A third direction 28 extends parallel to the edges 9 that are measured using the measuring device 10.

The individual contours 17, 19, 26 are correlated with the respective spatial coordinates 14, 18, 25 by arrows.

Figure 2:
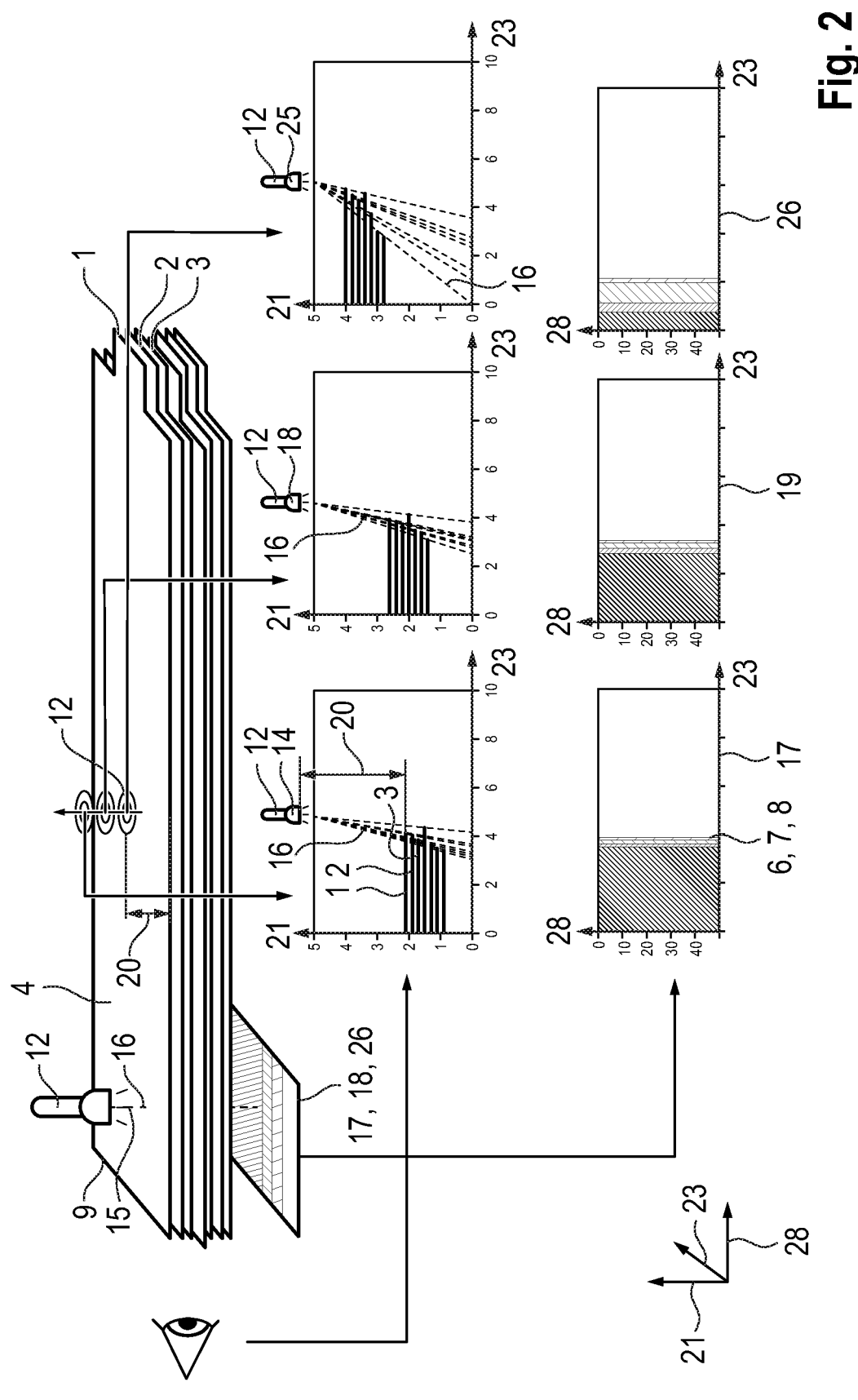
FIG. 2 shows a second embodiment of the method.

FIG. 2 shows a second variant of the method. Reference is made to the remarks in relation to FIG. 1.

In contrast to the first variant, in which the beam source 12 is moved between steps b) and d) parallel to the planes 4 toward the second spatial coordinate 18, in the second variant the beam source 12 is moved between steps b) and d) transversely to the planes 4 toward the second spatial coordinate 18 or toward the third spatial coordinate 25. The different contours 17, 19, 26 generated in this manner also enable the unambiguous determination of the edge 9 of each electrode sheet 1, 2, 3.

The first spatial coordinate 14 and the at least one second spatial coordinate 18, 25 (i.e., the second and third spatial coordinates) differ from one another by a different separation 20 from the stack 5. The separation 20 extends along a first direction 21 extending transversely to the planes 4.

The individual contours 17, 19, 26 are correlated with the respective spatial coordinates 14, 18, 25 by arrows.

Figure 3:
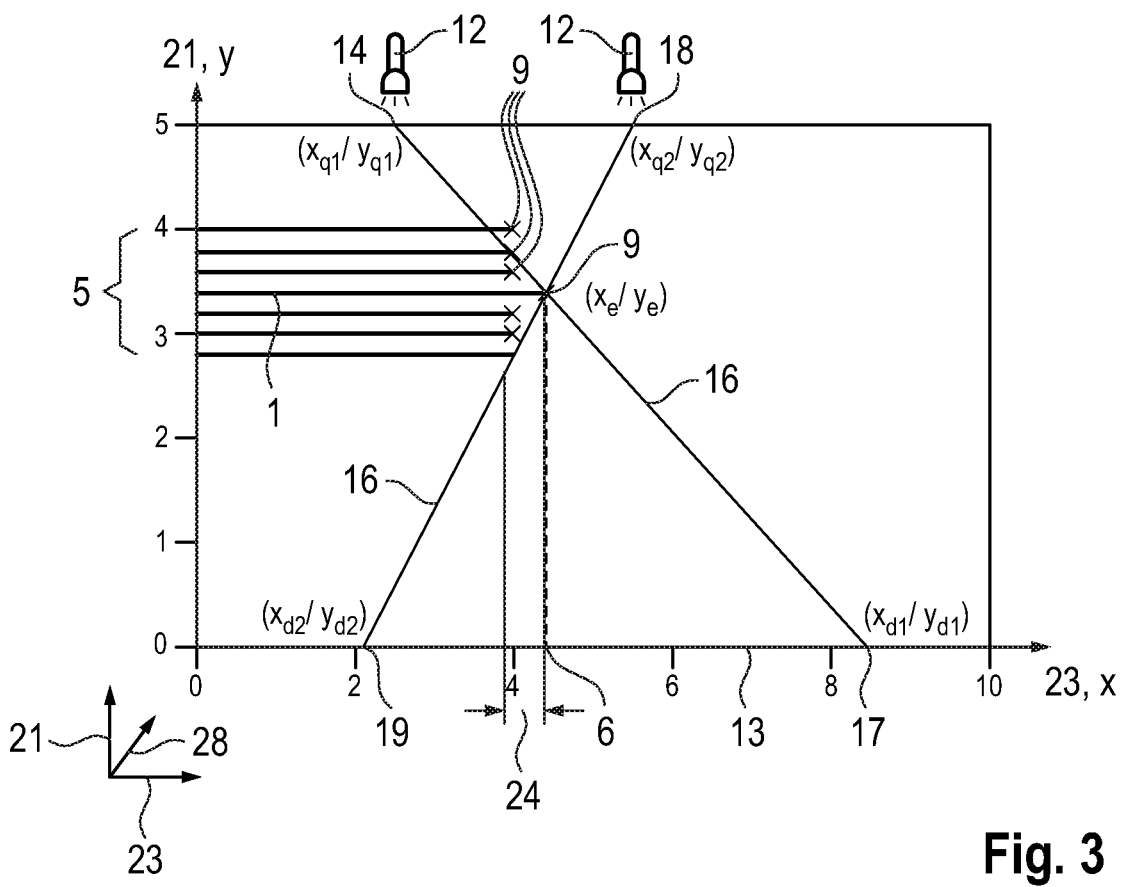
FIG. 3 shows step f) of the method according to the first variant.

FIG. 3 shows step f) of the method according to the first variant. Reference is made to the remarks in relation to FIG. 1.

According to step f), the various contours 17, 19, 26 are evaluated and the positions 6, 7, 8 of the edges 9 of the electrode sheets 1, 2, 3 are determined. The evaluation is carried out by the system 27 for data processing.

The stack 5, the beam source 12, and the detector 13 are viewed on a common plane. A spatial coordinate z is therefore identical for all components 1, 2, 3, 5, 12, 13. The first direction 21, i.e., transverse to the planes 4, extends along a y axis (here the vertical axis in the upper diagram of FIG. 3). The second direction 23, i.e., parallel to the planes 4, extends along the x axis (here the horizontal axis in the upper diagram of FIG. 3). A third direction 28 extends along a z axis (here the backward-pointing axis in the upper diagram of FIG. 3).

The first spatial coordinates 14 are $(x_{q1}|y_{q1})$, and the second spatial coordinates 18 are $(x_{q2}|y_{q2})$. The spatial coordinates of the edge 9 of the first electrode sheet 1 that is to be determined are denoted as $(x_e|y_e)$. The positions of the edge 9 of this electrode sheet 1 in the first contour 13 detected by the detector 13 are $(x_{d1}|y_{d1})$ for the first spatial coordinates 14 of the beam source 12 and, in the second contour 19, $(x_{d2}|y_{d2})$ for the second spatial coordinates 18 of the beam source 12.

The following applies to the linear equation for the first spatial coordinates 14 of the beam source 12:

$$m_1 = \frac{\Delta y_1}{\Delta x_1} = \frac{y_{d1} - y_{q1}}{x_{d1} - x_{q1}} \tag{1}$$

$$y = m_1 \cdot (x - x_{q1}) + y_{q1} \tag{2}$$

$$y = m_1 x + b_1 \tag{3}$$

For the linear equation of the second spatial coordinates 18 of the beam source 12, the following applies:

$$m_2 = \frac{\Delta y_2}{\Delta x_2} = \frac{y_{d2} - y_{q2}}{x_{d2} - x_{q2}} \tag{1}$$

$$y = m_2 \cdot (x - x_{q2}) + y_{q2} \tag{2}$$

$$y = m_2 x + b_2 \tag{3}$$

These equations are equated, so that:

$$m_1 \cdot x + b_1 = m_2 \cdot x + b_2 \tag{4}$$

$$\rightarrow (m_1 - m_2) \cdot x = b_2 - b_1 \tag{5}$$

$$\rightarrow x_e = \frac{b_2 - b_1}{(m_1 - m_2)} \tag{6}$$

$$\rightarrow y_e = m_1 \cdot \frac{b_2 - b_1}{(m_1 - m_2)} + b_1 \tag{7}$$

The spatial coordinates of $(x_e|y_e)$ indicate the first position 6 of the edge 9 of the first electrode sheet 1.

Figures 4, 5:
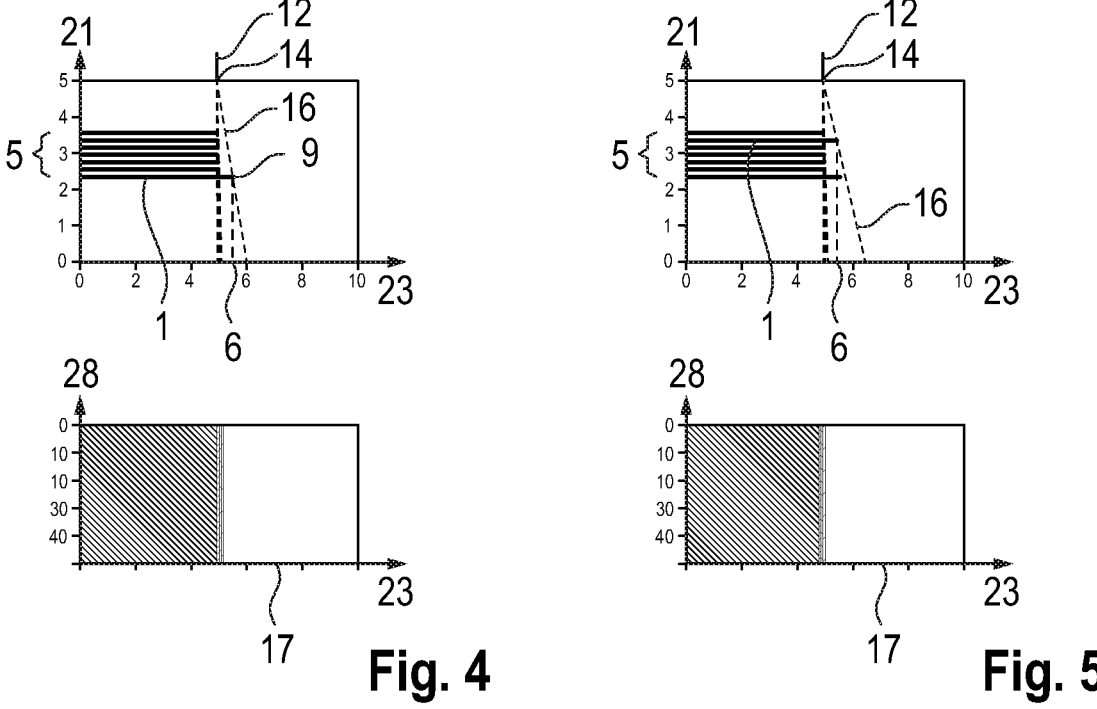
FIG. 4 shows steps b), d), and g) of the method for a first stack.
FIG. 5 shows steps b), d), and g) of the method for a second stack.

FIG. 4 shows steps b), d), and g) of the method for a first stack 5. Reference is made to the remarks in relation to FIG. 1.

In the first stack 5, the bottom first electrode sheet 1 has the greatest deviation 24 from a desired position. The placement accuracy is evaluated in a step g). A limit value for a maximum deviation 24 of the contour 17, 19, 26 (or of the position of the edge 9 identified in the contour) from a desired position of an edge 9 is specified for the stack 5. For the maximum deviation 24, it is assumed that the electrode sheet 1, 2, 3 closest to the detector 13 produces the maximum deviation 24.

The maximum deviation 24 is the maximum permissible difference between the desired position of an edge 9 in the stack 5 and an actual position 6, 7, 8 of the edge 9. The maximum deviation 24 is determined on the first contour 17, by taking into account the first spatial coordinates 14 compared to the desired position of the edges 9.

Only steps a), b), d), f), and g) are initially carried out in order to determine the placement accuracy, and steps c) and e) (see FIGS. 8 and 9) are carried out only if it is determined in step g) (see FIG. 4) that the limit value has been exceeded.

Each stack 5 is thus checked in the context of the present method with regard to placement accuracy, but a determination of the positions 6, 7, 8 of the edges of 9 all of the electrode sheets 1, 2, 3 in the stack 5 is only made if the limit value is exceeded, for example. Otherwise, each stack 5 is only checked for an overshoot of the limit value.

If it is determined that the limit value has been exceeded, steps c) and e) are carried out exactly twice with different (second) spatial coordinates 18, 25, whereupon steps f) and g) are carried out again (see FIGS. 8 and 9).

The first spatial coordinates 14 are selected such that the radiation source 12 is arranged precisely above, i.e., so as to be aligned in the first direction 21 with the desired position of the edges 9 of the stack 5 (see FIG. 4). The two second spatial coordinates 18, 25 (i.e., second and third spatial coordinates) are then selected such that the radiation source 12 is arranged so as to be offset relative to the first spatial coordinates 14 in the second direction 23, once toward the stack 5, so that the radiation source 12 is aligned with the stack 5 and offset once away from the stack 5, so that the radiation source 12 is located laterally adjacent to the stack 5 (see FIGS. 8 and 9).

If it is repeatedly determined in step g) that the limit value has been exceeded, steps c) and e) are carried out with a number of repetitions that are required for the unambiguous determination of the positions 6, 7, 8 of all edges 9.

By virtue of this step-by-step method, not every stack has to be fully measured (i.e., not all of the positions 6, 7, 8 of the edges 9 of all of the electrode sheets 1, 2, 3 have to be determined) during the production of the stacks 5. The maximum deviation 24 in the stack 5 can be detected or estimated on the basis of fewer contours 17, 19, 26, i.e., fewer images taken by the detector 13. If the limit value is exceeded, further measurements can be used to determine the respective positions 6, 7, 8 of the electrode sheets 1, 2, 3.

FIG. 5 shows steps b), d), and g) of the method for a second stack 5. Reference is made to the remarks in relation to FIG. 4.

In the second stack 5, the uppermost first electrode sheet 1 has the greatest deviation 24 from a desired position. The placement accuracy is evaluated in a step g). A limit value for a maximum deviation 24 of the contour 17, 19, 26 (or of the position of the edge 9 identified in the contour) from a desired position of an edge 9 is specified for the stack 5. For the maximum deviation 24, it is assumed that the electrode sheet 1, 2, 3 closest to the detector 13 produces the maximum deviation 24. For the second stack 5 that is shown, the greatest deviation 24 that can be recognized in the first contour 17 would then be much smaller (that is, if the first electrode sheet 1 were arranged at the very bottom of the stack 5). In this case impermissibly large deviations 24 could not be recognized.

If it is determined that the limit value has been exceeded, steps c) and e) are carried out exactly twice with different (second) spatial coordinates 18, 25, whereupon steps f) and g) are carried out again (see FIGS. 6 and 7).

The first spatial coordinates 14 are selected such that the radiation source 12 is arranged precisely above, i.e., so as to be aligned in the first direction 21 with the desired position of the edges 9 of the stack 5 (see FIG. 5). The two second spatial coordinates 18, 25 (i.e., second and third spatial coordinates) are then selected such that the radiation source 12 is arranged so as to be offset relative to the first spatial coordinates 14 in the second direction 23, once toward the stack 5, so that the radiation source 12 is aligned with the stack 5 and offset once away from the stack 5, so that the radiation source 12 is located laterally adjacent to the stack 5 (see FIGS. 6 and 7).

LIST OF REFERENCE SYMBOLS

1 first electrode sheet
2 second electrode sheet
3 third electrode sheet
4 plane
5 stack
6 first position
7 second position
8 third position
9 edge
10 measuring device
11 X-ray system
12 beam source
13 detector
14 first spatial coordinate
15 beam direction
16 beam
17 first contour
18 second spatial coordinate
19 second contour
20 separation
21 first direction (y axis)
22 distance
23 second direction (z axis)
24 deviation
25 third spatial coordinate
26 third contour
27 system
28 third direction (x axis)

The invention claimed is:

1. A method for determining a placement accuracy of a plurality of electrode sheets, wherein the electrode sheets extend on mutually parallel planes and are stacked on top of one another and form a stack of electrode sheets;

wherein the placement accuracy describes positions of the edges of all of the electrode sheets relative to one another in the stack of electrode sheets;

wherein the method is carried out using a measuring device having a two-dimensionally resolving X-ray system with at least one beam source for X-ray radiation and a detector, and comprising at least the following steps:

a) providing the stack of electrode sheets and arranging the stack of electrode sheets in the measuring device between at least one beam source and the detector;

b) irradiating the stack of electrode sheets with the at least one beam source from a first spatial coordinate, with a beam direction extending at least transversely to the parallel planes and toward the detector, and with a beam from the beam source detecting the edges of the electrode sheets that are arranged one above the other and projecting a two-dimensional first contour of the edges of the stack of electrode sheets onto the detector;

c) irradiating the stack of electrode sheets with the at least one beam source from at least one second spatial coordinate that differs from the first spatial coordinate, the beam detecting the stacked edges of the electrode sheets and projecting a two-dimensional second contour of the edges of the stack of electrode sheets onto the detector;

d) detecting the two-dimensional first contour using the detector;

e) detecting the two-dimensional second contour using the detector; and f) evaluating the two-dimensional first contour and the two-dimensional second contour, and determining the positions of the edges of the electrode sheets, g) performing an assessment of the placement accuracy;

wherein a limit value for a maximum deviation of the respective contour from a desired position of an edge is specified for the stack of electrode sheets, and wherein whichever electrode sheet is closest to the detector is assumed to produce the maximum deviation, and wherein the steps of providing, of irradiating the stack of electrode sheets with the at least one beam source from a first spatial coordinate, of detecting the two-dimensional first contour, of evaluating and determining, and of performing are initially carried out in order to determine the placement accuracy, and the steps of irradiating the stack of electrode sheets with the at least one beam source from at least one second spatial coordinate and of detecting the two-dimensional second contour are carried out when it is determined in the step of performing an assessment that the limit value has been exceeded.

2. The method as set forth in claim 1, wherein the first spatial coordinate and the at least one second spatial coordinate differ from one another by a mutually different separation from the stack of electrode sheets, in which case the separation extends along a first direction which is transverse to the parallel planes, or by a mutually different distance from the edges, in which case the mutually different distance extends along a second direction which is parallel to the parallel planes and is transverse to the edges.

3. The method as set forth in claim 1, wherein, during the step of evaluating and determining, the edges of each of the electrode sheets in the two-dimensional first contour and/or the two-dimensional second contour are correlated with the respective spatial coordinates using linear equations.

4. The method as set forth in claim 1, wherein, when it is determined that the limit value has been exceeded, the steps of irradiating the stack of electrode sheets with the at least one beam source from at least one second spatial coordinate and of detecting the two-dimensional second contour are carried out exactly twice with mutually different spatial coordinates, whereupon the steps of evaluating and determining and of performing an assessment are carried out again.

5. The method as set forth in claim 1, wherein artificial intelligence is used at least for the step of evaluating and determining.

6. The method as set forth in claim 1, further comprising:

h) determining and altering at least one process parameter from the evaluation of the placement accuracy according to the step of performing an assessment used to produce the respective stack of electrode sheets, thereby improving the placement accuracy for further stacks of electrode sheets.

7. The method as set forth in claim 4, wherein, when it is repeatedly determined in the step of performing an assessment that the limit value has been exceeded, the steps of irradiating the stack of electrode sheets with the at least one beam source from at least one second spatial coordinate and of detecting the two-dimensional second contour are carried out with a number of repetitions that are required for the unambiguous determination of the positions of all edges.

8. A method for determining a placement accuracy of a plurality of electrode sheets, wherein the electrode sheets extend on mutually parallel planes and are stacked on top of one another and form a stack of electrode sheets;

wherein the placement accuracy describes positions of the edges of all of the electrode sheets relative to one another in the stack of electrode sheets;

wherein the method is carried out using a measuring device having a two-dimensionally resolving X-ray system with at least one beam source for X-ray radiation and a detector, and comprising at least the following steps:

a) providing the stack of electrode sheets and arranging the stack of electrode sheets in the measuring device between the at least one beam source and the detector;

b) irradiating the stack of electrode sheets with the at least one beam source from a first spatial coordinate, with a beam direction extending at least perpendicular to the parallel planes and toward the detector, and with a beam from the beam source detecting the edges of the electrode sheets that are arranged one above the other and projecting a two-dimensional first contour of the edges of the stack of electrode sheets onto the detector;

c) irradiating the stack of electrode sheets with the at least one beam source from at least one second spatial coordinate that differs from the first spatial coordinate, the beam detecting the stacked edges of the electrode sheets and projecting a two-dimensional second contour of the edges of the stack of electrode sheets onto the detector;

d) detecting the two-dimensional first contour using the detector;

e) detecting the two-dimensional second contour using the detector; and f) evaluating the two-dimensional first contour and the two-dimensional second contour using a convolutional neural network, and determining the positions of the edges of the electrode sheets;

wherein the convolutional neural network learns from a synthetic data set for a stack of electrode sheets with known positions of the edges of the electrode sheets in order to then determine the position of the edge of each electrode sheet from the contours of the stack of electrode sheets detected in the step of detecting the two-dimensional first contour.

9. The method as set forth in claim 8, wherein the first spatial coordinate and the at least one second spatial coordinate differ from one another by a mutually different separation from the stack of electrode sheets, in which case the separation extends along a first direction which is transverse to the parallel planes, or by a mutually different distance from the edges, in which case the mutually different distance extends along a second direction which is parallel to the parallel planes and is transverse to the edges.

10. The method as set forth in claim 8, wherein, during the step of evaluating and determining, the edges of each of the electrode sheets in the two-dimensional first contour and/or the two-dimensional second contour are correlated with the respective spatial coordinates using linear equations.

11. The method as set forth in claim 8, wherein artificial intelligence is used at least for the step of evaluating and determining.

\* \* \* \* \*